United States Statutory Invention Registration [19]

[11] Reg. Number: H771

Cytron et al. [43] Published: Apr. 3, 1990

[54] METHOD FOR CASTING A ROTATING BAND ONTO A PROJECTILE

[75] Inventors: Sheldon Cytron, Mountain Lakes; William P. Keown, deceased, late of West Milford, both of N.J., by Evelyn Keown, executrix

[73] Assignee: The United States of America as represented by the Secretary of the Army, Washington, D.C.

[21] Appl. No.: 396,716

[22] Filed: Aug. 17, 1989

[51] Int. Cl.[4] ..... B21K 21/06

[52] U.S. Cl. ..... 29/1.23; 164/69.1

*Primary Examiner*—Harold J. Tudor

*Attorney, Agent, or Firm*—Robert P. Gibson; Edward Goldberg; Edward F. Costigan

[57] ABSTRACT

A method for casting a rotating band onto a projectile having a metallic shell, with a nose at one end, a closed base at the other end, and a hollow core axially formed within said shell. The method comprises the steps of (a) forming a projectile mold having three sections, a first section for the nose, a second section for the closed base, and a third section for the rotating band seat; (b) casting hot metal into the mold; (c) removing the mold from the third section so as to expose the rotating band seat therein; (d) clamping a ring mold about the rotating band seat; (e) casting hot metal into the ring mold to form a rotating band within and above the rotating band seat; and (f) cooling the projectile.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR CASTING A ROTATING BAND ONTO A PROJECTILE

GOVERNMENTAL INTEREST

The invention described herein may be manufactured, used and licensed by or for the Government for Governmental purposes without payment to us of any royalties thereon.

BACKGROUND OF THE INVENTION

The field of the invention pertains to forming rotating bands on hot shapes, such as projectiles for munitions use. More particularly, the invention is directed to the method of applying an annulus or concentric band to the shell of the projectile so that a strong bond is developed at the metal to metal interface around the middle periphery of the projectile.

In the prior art, projectiles were forged into a rough shape, and then they were fashioned into a near net finished shape. The projectiles were then heat treated; followed by machining a rotating band seat around the middle periphery of the projectile. A rotating band was then applied within said seat by swaging a preformed band to the projectile, or, in the case of a thin wall projectile which could not withstand the swaging forces, the rotating band was formed by weldments of suitable material within said seat. Another method known for applying such rotating bands is to melt the rotating band material in-situ by means of an induction coil. All of the prior art methods are expensive and time consuming. Further, they require glass bead blasting of the band seat and additional heat treating of the heat effected zone adjacent to the band seat and rotating band.

SUMMARY OF THE INVENTION

It is an object of the present invention, therefore, to provide a novel method for forming rotating bands on hot shapes which substantially minimizes the requirements for machining the piece to achieve the desired configuration.

Another object of the present invention is to provide a method for forming rotating bands on hot shapes which substantially eliminates or minimizes the need for surface preparation of a band seat such as by glass bead blasting or the like.

Yet another object of the present invention is to provide a method for forming rotating bands on hot shapes which reduces both the time involved in the manufacturing of the projectile as well as the expense so involved.

These and other objects not enumerated are achieved by the method for casting a rotating band on a projectile according to the present invention, one embodiment of which may include the steps of forming an appropriate mold for casting the shell of the projectile such that a center section of the mold in the area of the location for the band is removable subsequent to casting of the shell casting, casting hot metal into such mold to form the shell of the projectile, removing a portion of the mold to expose the area of the rotating band seat, clamping a ring mold over and around the rotating band seat, casting hot metal into the ring mold so to form the rotating band in the form of an annular ring within, above and below the rotating band seat and finally, cooling the cast projectile with the rotating band thereon.

BRIEF DESCRIPTION OF THE DRAWINGS

A more complete understanding of the method of the present invention may be had from the following detailed description thereof particularly when read in the light of the accompanying drawings, wherein.

DETAILED DESCRIPTION OF THE PREFERRED EMBODIMENT

Figure 1:
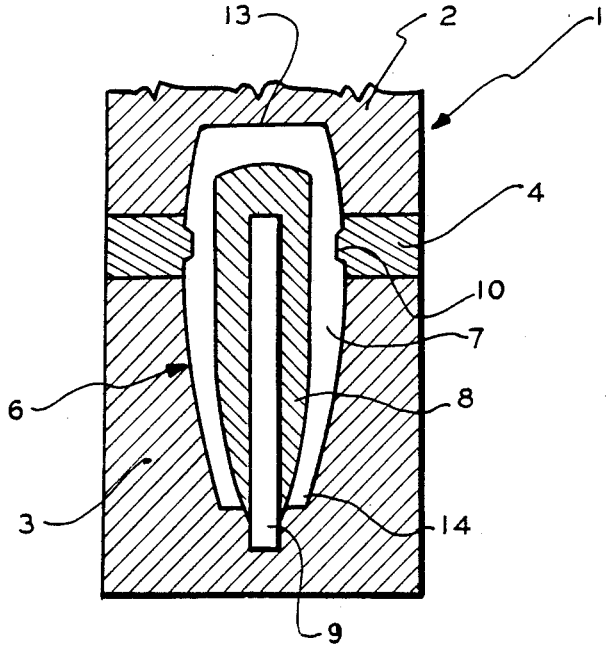
FIG. 1 is a side sectional view of hot cast molding of a projectile with a rotating band seat.
Figure 2:
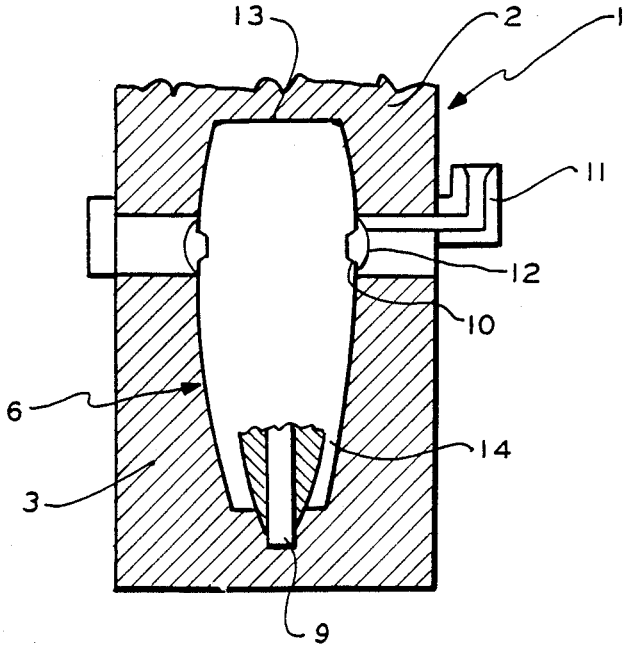
FIG. 2 is a side sectional view of ring molding of a rotating band onto the rotating band seat.

A preferred embodiment of the method for application of rotating bands to projectiles is best described in the context of FIGS. 1 and 2.

The projectile mold is indicated generally by the reference numeral 1. Mold 1 is configured to define a cavity in which a metal projectile 6 may be cast axially upright. A projectile 6 formed within mold 1 will include an elongated body or shell being closed at one end and having a blunt nose at the other end. The shell is hollow to accommodate appropriate loading and a circumferential channel defining a band seat as is described below.

Mold 1, in order to accommodate the casting of a projectile such as that described, includes three sections. Upper mold section 2 defines a portion of the outer surface of a portion of the shell and the closed base of the projectile. A lower mold section 3 defines a portion of the outer surface of a portion of the shell and the blunt nose end of the shell. Disposed between the first and second mold sections 2 and 3 is a third mold section 4 which engages the first and second sections and defines the surface of the mold cavity for forming a band seat in the projectile. As is discussed below, the third mold section 4 is removable so as to permit casting of a rotating band onto the shell.

Disposed within the cavity defined by the first, second and third mold sections is a mold core 8 having a core arbor 9 disposed therein. Mold core 8 defines the inner hollow surface of the projectile shell and core arbor 9 which extends out of the mold core 8 axially into the lower second mold section 3 such as to define the surface of an opening to be formed in the blunt nose end of the projectile during casting.

Thus, a projectile formed in such a mold will include a generally axially extending elongated shell 7 having a closed base 13, a rotating band seat 10 defined by an annular channel formed generaly in the middle peripheral surface of the shell and a blunt nose 14 with an opening formed therein.

Referring to FIG. 2, the mold 1 is shown with the projectile shell having been cast, third mold section 4 removed and a ring mold 11 positioned in place of third mold section 4, the ring mold for forming a rotating band 12 on the shell surface so as to be above, below and within the band seat 10.

Thus, the inner surface of ring mold 11 cooperates with the outer surface of shell 6 to define a cavity for forming the rotating ring. Further, as can be seen in FIG. 2, the rotating ring, once cast, extends above, below and within the channel of band seat 10.

The projectile shell 7 is cast by pouring hot metal into the mold 1. After a period of cooling, the band seat removable mold second section 4 is removed from the mold 1 under an inert gas shroud so as to expose the band seat 10 around the shell 7. Over and around the band seat 10 a ring mold 11 then is clamped, into which hot cast metal is poured to form a rotating band 12 in the form of an annular ring within, above and below the band seat 10. After sufficient cooling, the entire projectile 6 is removed from the mold 1.

It is a characteristic of the rotating band 12 of the present invention that there is a strong and defect-free metal to metal bond between the rotating band 12 and its seat 10. After molding, the rotating band 12 is cooled and machined to exact specifications. The rotating band is then heat treated using known techniques to remove any residual stresses.

As can be seen from the foregoing, the method of the present invention provides for forming a projectile by a two-step casting operation which clearly constitutes an improvement over known techniques. There is no need for surface blasting, the technique is less expensive than prior methods and less time-consuming.

While the present invention has been described with a degree of particularity in connection with a preferred embodiment, it should be understood that variations and modifications will be obvious to those skilled in the art without departing from the scope of the present invention as defined in the appended claims.

The foregoing disclosure and drawing are merely illustrative of the principles of this invention and are not to be interpreted in a limiting sense. We wish it to be understood that we do not desire to be limited to the exact details of construction shown and described because obvious modifications will occur to a person skilled in the art.

What is claimed is:

1. A method for manufacturing a projectile having a metallic shell with a nose at one end, a closed base at the other end and a hollow core axially formed within said shell, said shell having a generally cylindrical band disposed there around, said method comprising the steps of:

a. forming a mold for casting said shell, said mold having three sections, a first section defining a cavity to form the nose end of said shell, a second section defining a cavity to form the closed base end of said shell; and a third section disposed between and engaging said first section and said second section, for forming an annular groove as a rotating band seat around the middle periphery of said shell;

b. casting hot metal into said mold to form said projectile therein;

c. removing said third section of the mold so as to expose the rotating band seat;

d. clamping a ring mold over and around the rotating band seat;

e. casting hot metal into said ring mold so as to cast a rotating band in the form of an annular ring within, above and below said rotating band seat; and f. cooling said cast projectile with the rotating band thereon.

2. The method recited in claim 1 further comprising the step of heat treating the rotating band.

3. The method recited in claim 1 further comprising the step of machining the rotating band to exact specifications.

4. The method of claim 1 wherein one or more of the mold sections are graphite molds.

5. The method of claim 1 wherein said first and second mold sections are permanent molds.

6. The method of claim 1 wherein said third mold section is a removable mold.

7. The method of claim 1 wherein the casting is performed under an inert gas shroud.

* * * * *